(12) United States Patent
Aizaki et al.

(10) Patent No.: US 10,222,275 B2
(45) Date of Patent: Mar. 5, 2019

(54) LIGHT EMITTING DEVICE AND PROJECTION TYPE IMAGE DISPLAY APPARATUS

(71) Applicant: JVC KENWOOD Corporation, Yokohama-shi, Kanagawa (JP)

(72) Inventors: Takatsugu Aizaki, Yokohama (JP); Shinji Kikuma, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 44 days.

(21) Appl. No.: 15/647,419

(22) Filed: Jul. 12, 2017

(65) Prior Publication Data

US 2018/0058946 A1 Mar. 1, 2018

(30) Foreign Application Priority Data

Sep. 1, 2016 (JP) .................. 2016-170825

(51) Int. Cl.
*G03B 21/14* (2006.01)
*G02F 1/01* (2006.01)
*G01K 11/32* (2006.01)
*G03B 21/20* (2006.01)
(Continued)

(52) U.S. Cl.
CPC ............. *G01K 11/32* (2013.01); *G02F 1/01* (2013.01); *G02F 1/0105* (2013.01); *G02F 1/133504* (2013.01); *G03B 21/204* (2013.01); *G03B 21/206* (2013.01); *G03B 21/208* (2013.01); *G03B 21/2033* (2013.01); *G02F 1/133512* (2013.01); *G02F 2001/133614* (2013.01);
(Continued)

(58) Field of Classification Search
CPC .. G03B 21/14; G03B 21/2033; G03B 21/204; G02F 1/01; G02F 1/0105
See application file for complete search history.

(56) References Cited

U.S. PATENT DOCUMENTS 9,083,894 B2 * 7/2015 Kobayashi ............. G02B 5/005
2004/0080722 A1 * 4/2004 Yamasaki ............... G03B 21/16
353/97

(Continued)

FOREIGN PATENT DOCUMENTS

EP 2634628 B1 * 9/2016 ............. G02B 5/005
WO 2014203652 A1 12/2014

*Primary Examiner* — William C Dowling
(74) *Attorney, Agent, or Firm* — Amin, Turocy & Watson LLP

(57) ABSTRACT

A light emitting device includes a light source which emits source light having a first wavelength, a fluorescent substance which excites fluorescent light having a second wavelength by the source light and emits the source light and the fluorescent light as illumination light, a fly-eye lens, and a light shielding unit. In the illumination light, a first wavelength component in a first region which is a portion of a region in a cross-sectional view with respect to the traveling direction of the light is smaller than that in a second region which is a region other than the first region. The light shielding unit includes a diaphragm unit which shields the illumination light L and a filter which shields the light having the second wavelength of the illumination light in the second region and transmits the light having the first wavelength of the illumination light in the second region.

6 Claims, 6 Drawing Sheets

(51) Int. Cl.
  *G02F 1/1335* (2006.01)
  *G02F 1/13363* (2006.01)
(52) U.S. Cl.
  CPC ............ *G02F 2001/133624* (2013.01); *G02F 2001/133637* (2013.01)

(56) References Cited

U.S. PATENT DOCUMENTS

| | | | | |
|---|---|---|---|---|
| 2005/0179871 A1* | 8/2005 | Kobayashi | ............. | G02B 5/005 353/31 |
| 2006/0050248 A1* | 3/2006 | Koga | ................... | H04N 9/3152 353/97 |
| 2018/0063489 A1* | 3/2018 | Aizaki | ................. | H04N 9/3105 |

* cited by examiner

CLOSED STATE

| STATE | PRESENT EMBODIMENT (INCLUDING FILTER) | | COMPARATIVE EXAMPLE (NOT INCLUDING FILTER) | |
|---|---|---|---|---|
| | OPEN | CLOSED | OPEN | CLOSED |
| FIRST WAVELENGTH REGION RB | 52 | 16 | 52 | 16 |
| SECOND WAVELENGTH REGION RY | 60 | 20 | 60 | 24 |
| AREA RATIO | 86.7% | 80.0% | 86.7% | 66.7% |
| COLOR TEMPERATURE | 6500K | 6200K | 6500K | 5500K |

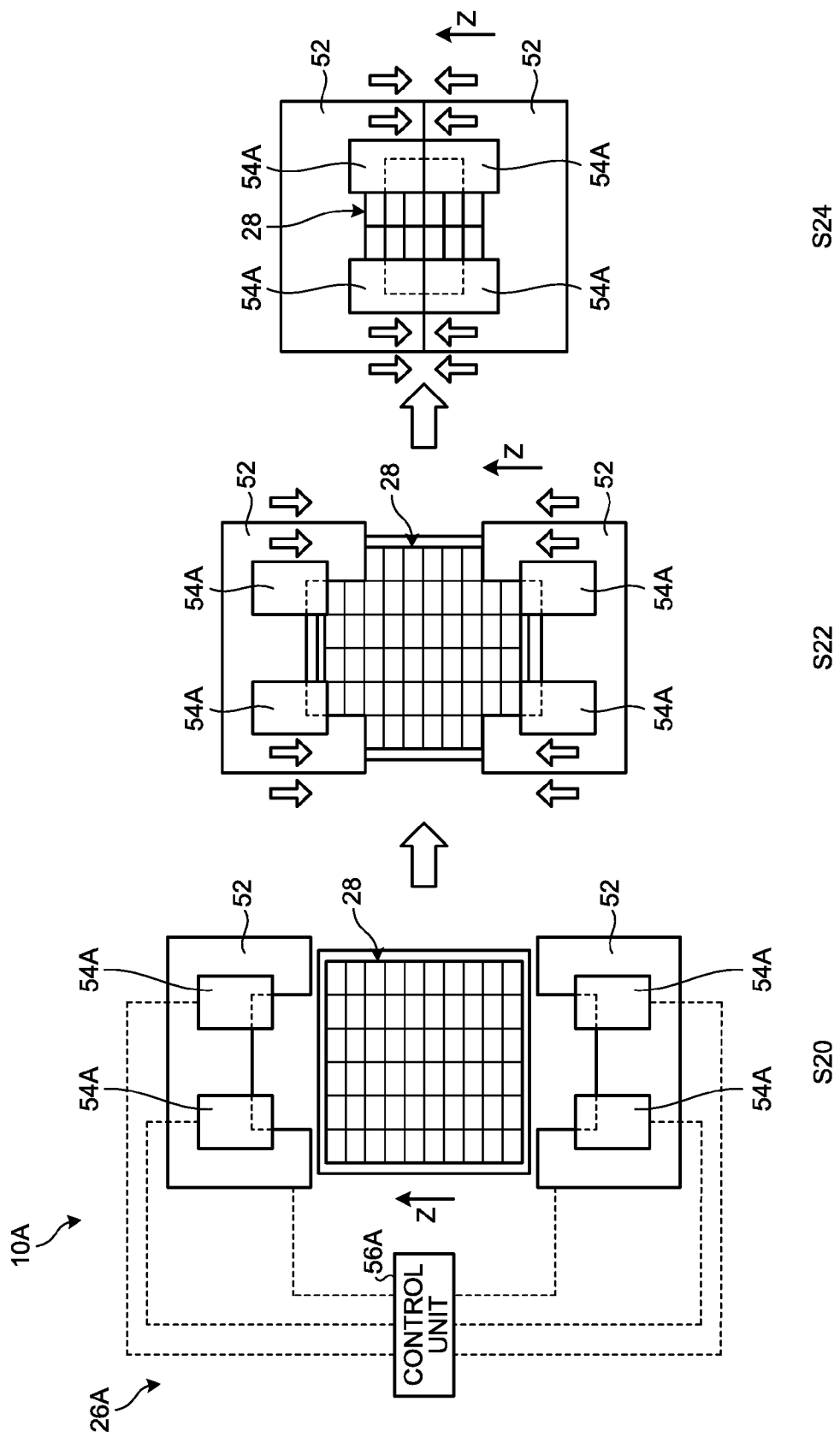

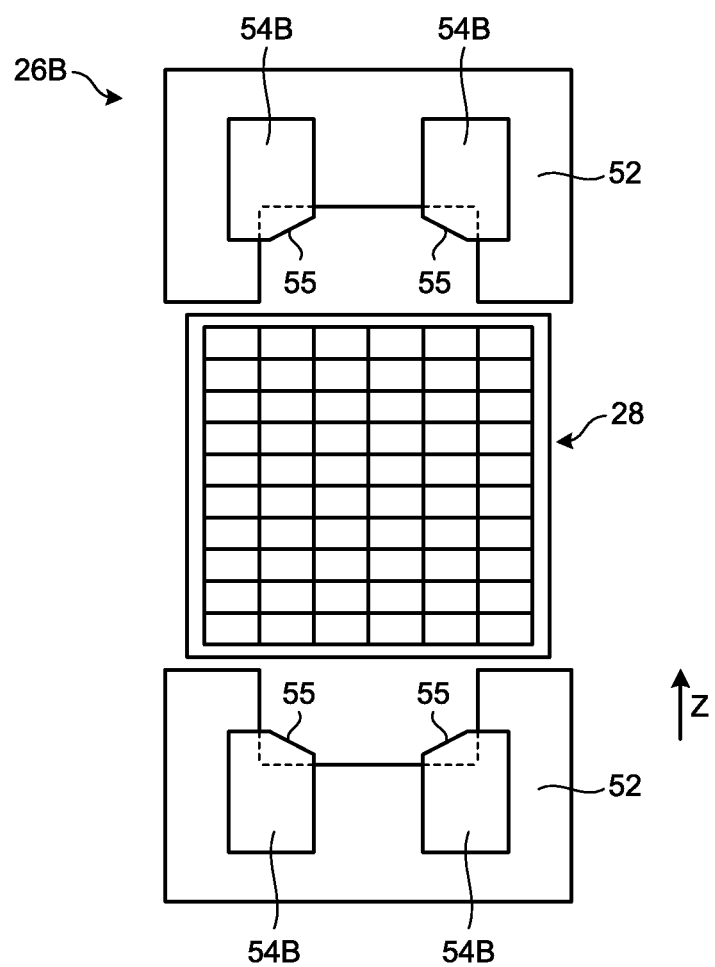

LIGHT EMITTING DEVICE AND PROJECTION TYPE IMAGE DISPLAY APPARATUS

CROSS-REFERENCE TO RELATED APPLICATION(S)

The present application claims priority to and incorporates by reference the entire contents of Japanese Patent Application No. 2016-170825 filed in Japan on Sep. 1, 2016.

BACKGROUND OF THE INVENTION

1. Field of the Invention

The present invention relates to a light emitting device and a projection type image display apparatus.

2. Description of the Related Art

A projection type image display apparatus displays an image by illumination light from a light emitting device including a light source. In order to control brightness or the like of an image to be displayed, in some case, the light emitting device may be configured to include a diaphragm for shielding light.

Herein, in a projection type image display apparatus using, for example, a liquid crystal panel as a optical modulation element, it is preferable that illumination light incident on the optical modulation element is white light. In addition, due to structural reason or the like of the light emitting device, illumination light other than white light may be used. However, if balance of color components of the illumination light is maintained constant regardless of a degree of light shielding of a diaphragm, influence on image display is small. Patent document WO 2014/203652 A is an example of the related art.

However, in some cases, as illumination light that is not white light, illumination light having a distribution of colors, in which balance of color components is different in each region in a case where the illumination light is viewed in cross section, may be used. When such illumination light is used, there is a possibility that the balance of the color components of the entire region when not shielding light by the diaphragm and the balance of color components of the entire region when shielding a portion by using the diaphragm differ from each other. For example, in a case where the region in which the balance of color component is different from other region is shielded, the balance of the color components as a whole changes from that at the time of fully opening the diaphragm. In this manner, if the balance of the color components is deviated at the time of using the diaphragm, deterioration of image quality may occur, for example, color different from intended color may be displayed.

SUMMARY OF THE INVENTION

It is an object of the present invention to at least partially solve the problems in the conventional technology.

A light emitting device of an aspect of the embodiment comprises: a light source which emits source light having a first wavelength; a fluorescent substance on which the source light is incident and which excites fluorescent light having a second wavelength by the source light, reflects the source light, and emits the source light and the fluorescent light as illumination light; a fly-eye lens on which the illumination light is incident; and a light shielding unit which is provided between the fluorescent substance and the fly-eye lens and is configured to be capable of shielding a portion of the illumination light, wherein, in the illumination light incident on the fly-eye lens, a first wavelength component in a first region which is a portion of a region in a cross-sectional view with respect to the traveling direction of the light is smaller than that in a second region which is a region other than the first region, and wherein the light-shielding unit includes: a diaphragm unit which shields the illumination light; and a filter that shields light having the second wavelength of the illumination light in the second region and transmits light having the first wavelength of the illumination light in the second region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an explanatory diagram describing a light shielding unit according to a second embodiment; and FIG. 7 is an explanatory diagram describing a light shielding unit according to a third embodiment.

DETAILED DESCRIPTION OF THE PREFERRED EMBODIMENTS

Hereinafter, embodiments of the invention will be described in detail with reference to the drawings. In addition, the invention is not limited by the embodiments described below.

In the following description, an XYZ rectangular coordinate system is set, and the positional relationship of each component will be described with reference to the XYZ rectangular coordinate system. A direction parallel to an X axis which is a first axis in a predetermined plane is defined as an X axis direction, a direction parallel to an Y axis which is a second axis in the predetermined plane perpendicular to the first axis is an Y axis direction, and a direction parallel to a Z axis which is a third axis perpendicular to the first and second axes is defined as a Z axis direction. The third axis is perpendicular to the predetermined plane. In addition, one direction in the X axis direction is defined as a +X direction, and the direction opposite to the +X direction is defined as a −X direction. One direction in the Y axis direction is defined as a +Y direction, and the direction opposite to the +Y direction is defined as a −Y direction. One direction in the Z axis direction is defined as a +Z direction, and the direction opposite to the +Z direction is defined as a −Z direction. In the following embodiments, the predetermined plane is parallel to a horizontal plane, and the Z axis direction is the vertical direction. In the following description, appropriately, the predetermined plane will be referred to as an XY plane.

First Embodiment

Overall Configuration of Projection Type Image Display Apparatus

Figure 1:
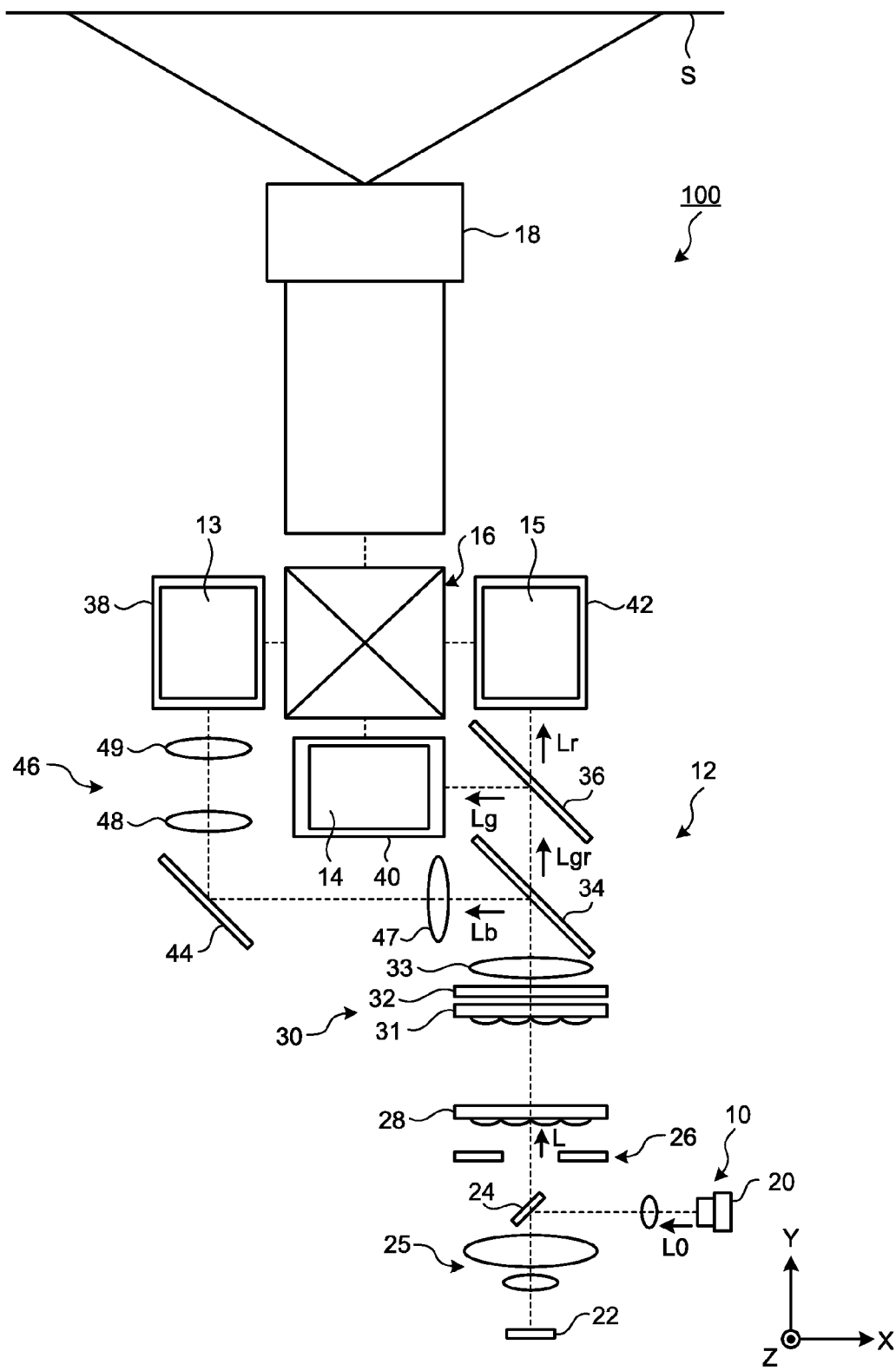
FIG. 1 is a schematic plan diagram illustrating an example of a projection type image display apparatus according to a first embodiment.

FIG. 1 is a schematic plan diagram illustrating an example of a projection type image display apparatus according to a first embodiment. As illustrated in FIG. 1, a projection type image display apparatus 100 according to the first embodiment is configured to include a light emitting device 10, an illumination optical system 12, a first reflection type liquid crystal panel 13, a second reflection type liquid crystal panel 14, and a third reflection type liquid crystal panel 15, a combination optical system 16, and a projection optical system 18. The light emitting device 10 is configured to include a light source that generates light. The illumination optical system 12 is configured to include a first color separation element 34 and a second color separation element 36, and separates light emitted from the light emitting device 10 by color to generate first color light Lb, second color light Lg, and third color light Lr. The first reflection type liquid crystal panel 13, the second reflection type liquid crystal panel 14, and the third reflection type liquid crystal panel 15 are arranged on respective optical paths of the first color light Lb, the second color light Lg, and the third color light Lr generated by the illumination optical system 12, and modulate the light of the first color light Lb, the second color light Lg, and the third color light Lr on the basis of image data, respectively. The combination optical system 16 combines the first color light Lb, the second color light Lg, and the third color light Lr modulated by the first reflection type liquid crystal panel 13, the second reflection type liquid crystal panel 14, and the third reflection type liquid crystal panel 15 to generate combined light. The projection optical system 18 projects the combined light generated by the combination optical system 16. The projection type image display apparatus 100 is an apparatus for displaying an image with illumination light emitted from the light emitting device 10.

In addition, in the first embodiment, each of the first color light Lb, the second color light Lg, and the third color light Lr is monochromatic component light out of the three color lights constituting the illumination light L. Specifically, the first color light Lb is blue light, the second color light Lg is green light, and the third color light Lr is red light.

As illustrated in FIG. 1, the light emitting device 10 generates the illumination light L. The light emitting device 10 emits the illumination light L to an integrator optical system 30 described later, and details thereof will be described later.

The illumination optical system 12 is configured to include the integrator optical system 30, the first color separation element 34, the second color separation element 36, a first reflection member 38, a second reflection member 40, a third reflection member 42, and a relay optical system 46. The integrator optical system 30 is supplied with the illumination light L from the light emitting device 10. The first color separation element 34 separates the first color light Lb from the illumination light L supplied from the integrator optical system 30 and supplies the first color light Lb in the −X direction. The second color separation element 36 separates the light Lgr supplied from the first color separation element 34 into the second color light Lg and the third color light Lr and supplies the second color light Lg in the −X direction and supplies the third color light Lr in the +Y direction. The first reflection member 38 reflects the first color light Lb supplied from the first color separation element 34 to the +Z direction. The second reflection member 40 reflects the second color light Lg supplied from the second color separation element 36 to the +Z direction. The third reflection member 42 reflects the third color light Lr supplied from the second color separation element 36 to the +Z direction. The relay optical system 46 is arranged on the optical path of the first color light Lb to form an inverted image.

The integrator optical system 30 uniforms illuminance of the illumination light L emitted from the light emitting device 10. The integrator optical system 30 is configured to include a fly-eye lens 31, a polarization conversion element 32, and a condenser lens 33. The optical axis of the integrator optical system 30 is parallel to the Y axis. The light emitted from the integrator optical system 30 travels in the +Y direction.

The fly-eye lens 31 has a plurality of microlenses arranged in a matrix on the XZ plane. The polarization conversion element 32 has a plurality of polarization conversion units. The polarization conversion unit is configured to include a polarization separation film, a reflection mirror, and a phase plate. The plurality of microlenses of the fly-eye lens 31 and the plurality of polarization conversion units of the polarization conversion element 32 correspond one to one to each other.

The illumination light L emitted from the light emitting device 10 and incident on the integrator optical system 30 is condensed on the microlenses of the fly-eye lens 31. A secondary light source image is formed on each of the plurality of microlenses of the fly-eye lens 31. Light from the secondary light source image formed on each microlens of the fly-eye lens 31 is incident on the polarization conversion unit of the polarization conversion element 32 corresponding to the microlens of the fly-eye lens 31. The light incident on the polarization conversion unit is separated into light in a first polarization state and light in a second polarization state by the polarization separation film. The light in the second polarization state separated by the polarization separation film is reflected by the reflection mirror and then passes through the phase plate to be converted into the light in the first polarization state. Namely, the illumination light L emitted from the light emitting device 10 passes through the polarization conversion element 32 to be converted into the light in the first polarization state.

The light emitted from each of the plurality of polarization conversion units is incident on the condenser lens 33. The condenser lens 33 superimposes the light emitted from each of the plurality of polarization conversion units on one light flux. Therefore, the illuminance distributions of the first reflection type liquid crystal panel 13, the second reflection type liquid crystal panel 14, and the third reflection type liquid crystal panel 15 are uniformed.

The first color separation element 34 is arranged on the +Y side of the integrator optical system 30. The first color separation element 34 is configured to include a dichroic mirror. The first color separation element 34 separates the first color light Lb from the light supplied from the light emitting device 10 through the integrator optical system 30. In the first embodiment, the first color separation element 34 separates the illumination light L supplied from the light emitting device 10 into blue light which is the first color light Lb and light Lgr having a wavelength different from that of the blue light. The first color light Lb which is the blue light is reflected by the first color separation element 34 and travels in the —X direction. The light Lgr having a wavelength different from that of the blue light passes through the first color separation element 34 and travels in the +Y direction.

The second color separation element 36 is arranged on the +Y side of the first color separation element 34. The second color separation element 36 includes a dichroic mirror. The second color separation element 36 separates the light Lgr having a wavelength different from that of the blue light supplied from the first color separation element 34 into the second color light Lg and the third color light Lr. In the first embodiment, the second color separation element 36 separates the light Lgr supplied from the first color separation element 34 into green light which is the second color light Lg and red light which is the third color light Lr. The second color light Lg which is green light is reflected by the second color separation element 36 and travels in the —X direction. The third color light Lr which is red light passes through the second color separation element 36 and travels in the +Y direction.

The first reflection member 38 reflects the first color light Lb supplied from the first color separation element 34 in the +Z direction. In the first embodiment, the illumination optical system 12 is configured to include a fourth reflection member 44 arranged between the first color separation element 34 and the first reflection member 38. The fourth reflection member 44 reflects the first color light Lb supplied from the first color separation element 34 in the +Y direction. The fourth reflection member 44 is arranged on the –X side of the first color separation element 34. The first color light Lb traveling from the first color separation element 34 in the —X direction is reflected by a reflection plane of the fourth reflection member 44 and travels in the +Y direction. The first reflection member 38 is arranged on the +Y side of the fourth reflection member 44. The first color light Lb traveling from the fourth reflection member 44 in the +Y direction is reflected by the reflection plane of the first reflection member 38 and travels in the +Z direction.

The second reflection member 40 reflects the second color light Lg supplied from the second color separation element 36 in the +Z direction. The second reflection member 40 is arranged on the –X side of the second color separation element 36. The second color light Lg traveling from the second color separation element 36 in the —X direction is reflected by the reflection plane of the second reflection member 40 and travels in the +Z direction.

The third reflection member 42 reflects the third color light Lr supplied from the second color separation element 36 in the +Z direction. The third reflection member 42 is arranged on the +Y side of the second color separation element 36. The third color light Lr traveling from the second color separation element 36 in the +Y direction is reflected by the reflection plane of the third reflection member 42 and travels in the +Z direction.

The relay optical system 46 is arranged on the optical path of the first color light Lb between the first color separation element 34 and the first reflection type liquid crystal panel 13. In the first embodiment, the relay optical system 46 is arranged on the optical path of the first color light Lb between the first color separation element 34 and the first reflection member 38. The relay optical system 46 forms an image of an object on an object plane side of the relay optical system 46 on an image plane side of the relay optical system 46.

The relay optical system 46 is configured to include a first condenser lens 47 arranged between the first color separation element 34 and the fourth reflection member 44 and a second condenser lens 48 and a third condenser lens 49 arranged between the fourth reflection member 44 and the first reflection member 38. Each of the first condenser lens 47, the second condenser lens 48, and the third condenser lens 49 is a convex lens. The relay optical system 46 forms an erect image of the object on the image plane side.

The first reflection type liquid crystal panel 13 is an optical modulation element which modulates the light of the first color light Lb supplied from the first reflection member 38 on the basis of the image data. The first reflection type liquid crystal panel 13 is arranged on the +Z side of the first reflection member 38. The first color light Lb traveling from the first reflection member 38 in the +Z direction is incident on the first reflection type liquid crystal panel 13. The first reflection type liquid crystal panel 13 reflects the first color light Lb supplied from the first reflection member 38 in the —Z direction.

The second reflection type liquid crystal panel 14 is an optical modulation element that modulates the light of the second color light Lg supplied from the second reflection member 40 on the basis of the image data. The second reflection type liquid crystal panel 14 is arranged on the +Z side of the second reflection member 40. The second color light Lg traveling from the second reflection member 40 in the +Z direction is incident on the second reflection type liquid crystal panel 14. The second reflection type liquid crystal panel 14 reflects the second color light Lg supplied from the second reflection member 40 in the —Z direction.

The third reflection type liquid crystal panel 15 is an optical modulation element which modulate the light of the third color light Lr supplied from the third reflection member 42 on the basis of the image data. The third reflection type liquid crystal panel 15 is arranged on the +Z side of the third reflection member 42. The third color light Lr traveling from the third reflection member 42 in the +Z direction is incident on the third reflection type liquid crystal panel 15. The third reflection type liquid crystal panel 15 reflects the third color light Lr supplied from the third reflection member 42 in the —Z direction.

Each of the first reflection type liquid crystal panel 13, the second reflection type liquid crystal panel 14, and the third reflection type liquid crystal panel 15 is configured to include a transparent substrate having a transparent electrode, an active matrix substrate having a reflective electrode, and a liquid crystal layer provided between the transparent substrate and the active matrix substrate. In each of the first reflection type liquid crystal panel 13, the second reflection type liquid crystal panel 14, and the third reflection type liquid crystal panel 15, the incident light is incident on the liquid crystal layer, and the light passing through the liquid crystal layer is reflected by the reflective electrode. Each of the first reflection type liquid crystal panel 13, the second reflection type liquid crystal panel 14, and the third reflection type liquid crystal panel 15 modulates the incident light in the liquid crystal layer in this manner, so that a predetermined image is displayed.

The combination optical system 16 combines the first color light Lb light-modulated by the first reflection type liquid crystal panel 13, the second color light Lg light-modulated by the second reflection type liquid crystal panel 14, and the third color light Lr light-modulated by the third reflection type liquid crystal panel 15 to generate the combined light. In the first embodiment, the combination optical system 16 is configured to include a cross dichroic prism.

The combined light generated by the combination optical system 16 is incident on the projection optical system 18, and the projection optical system projects the combined light onto a screen S.

Light Emitting Device

Next, the light emitting device 10 will be described in detail. As illustrated in FIG. 1, the light emitting device 10 is configured to include a light source 20, a fluorescent substance 22, a reflection mirror 24, a condensing optical system 25, a light shielding unit 26, and a fly-eye lens 28. The fluorescent substance 22, the reflection mirror 24, the condensing optical system 25, the light shielding unit 26, and the fly-eye lens 28 are arranged in the Y axis direction. The condensing optical system 25 is provided on the +Y direction side of the fluorescent substance 22. The reflection mirror 24 is provided on the +Y direction side of the condensing optical system 25. The light shielding unit 26 is provided on the +Y direction side of the reflection mirror 24. The fly-eye lens 28 is provided on the +Y direction side of the light shielding unit 26. The integrator optical system 30 is provided on the +Y direction side of the fly-eye lens 28.

The light source 20 is configured to include a laser diode (LD). The light source 20 excites source light L0. The source light L0 is light having a first wavelength and is light having a monochromatic component out of the three color lights constituting the illumination light L. More specifically, the source light L0 is light having the same color as the first color light Lb, that is, blue laser light. In other words, the source light L0 is the light having the first wavelength. In the first embodiment, the first wavelength is a wavelength of monochromatic component light (herein, blue color) out of the three colors. However, the source light L0 may have a wavelength component other than the first wavelength component.

The source light L0 from the light source 20 is incident on the fluorescent substance 22. The fluorescent substance 22 excites fluorescent light due to the incidence of the source light L0 and reflects a portion of the source light L0. When the source light L0 (blue light) having the first wavelength is incident, the fluorescent substance 22 excites (generates) the fluorescent light having a second wavelength. The fluorescent light having the second wavelength is light having a wavelength different from the first wavelength (light having a different color). In the first embodiment, the fluorescent light is light having a combined color of two monochromatic colors other than the source light L0 out of the three colors red, blue and yellow. Specifically, the second wavelength is the wavelength of yellow light in which the green light (second color light Lg) and the red light (third color light Lr) are combined, and the first wavelength, that is, the blue color component is not included.

In this manner, the fluorescent substance 22 excites the fluorescent light having the second wavelength and reflects the source light L0 which does not contribute to the excitation of the fluorescent light. Namely, the fluorescent substance 22 emits the source light L0 which is the light having the first wavelength and the fluorescent light which is the light having the second wavelength as the illumination light L. The illumination light L emitted from the fluorescent substance 22 has a first wavelength component and a second wavelength component. Namely, the illumination light L emitted from the fluorescent substance 22 has such a ratio that the ratio between the first wavelength component (light amount) and the second wavelength component (light amount) become the same as that of white light.

The reflection mirror 24 is a mirror body that reflects the light having the first wavelength and transmits the light having wavelength components other than the first wavelength, that is, the light having the second wavelength in this case. In the first embodiment, the reflection mirror 24 is a dichroic mirror. The reflection mirror 24 is arranged between the fluorescent substance 22 and the light shielding unit 26, more specifically, between the condensing optical system 25 and the light shielding unit 26 in the Y axis direction. The source light L0 from the light source 20 is incident on the reflection mirror 24. The reflection mirror 24 reflects the source light L0 having the first wavelength toward the fluorescent substance 22. Due to the incidence of the source light L0 reflected by the reflection mirror 24, the fluorescent substance 22 generates the illumination light L as described above.

The condensing optical system 25 condenses the illumination light L emitted from the fluorescent substance 22 and emits the illumination light in the +Y direction. The illumination light L is incident on the fly-eye lens 28 via the reflection mirror 24 and the light shielding unit 26. The light shielding unit 26 is a device that shields a portion of the illumination light L from the fluorescent substance 22. The configuration of the light shielding unit 26 will be described later. The fly-eye lens 28 has a plurality of microlenses arranged in a matrix on the XZ plane. The plurality of microlenses of the fly-eye lens 28 and the plurality of microlenses of the fly-eye lens 31 in the integrator optical system 30 correspond one to one to each other. The illumination light L from the fluorescent substance 22 is incident on each of the plurality of microlenses of the fly-eye lens 28 via the reflection mirror 24 and the light shielding unit 26. The fly-eye lens 28 condenses the illumination light L incident on each of the plurality of microlenses to the plurality of microlenses of the fly-eye lens 31. Herein, since a portion of the illumination light L is incident on each of the plurality of microlenses of the fly-eye lens 28 according to the position of each microlens, the light received by each microlens is different. In addition, the fly-eye lens 31 constitutes an optical pupil of the fly-eye lens 28.

Figure 2:
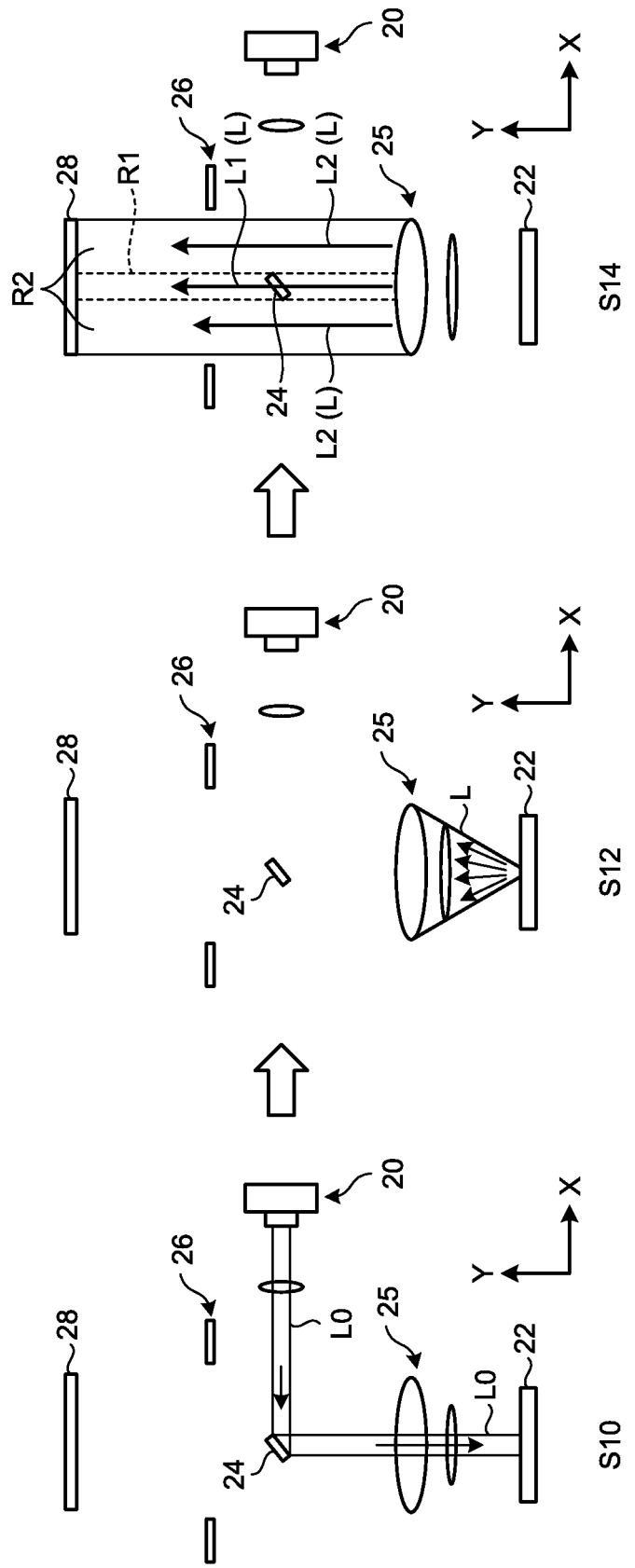
FIG. 2 is a schematic diagram illustrating a state of emission of illumination light.

Next, a state of emission of the illumination light L will be described. FIG. 2 is a schematic diagram illustrating the state of emission of the illumination light. Hereinafter, a case is exemplified where the emission of the illumination light L to be described with reference to FIG. 2 is not shielded by the light shielding unit 26. As illustrated in Step S10 in FIG. 2, the source light L0 from the light source 20 is reflected by the reflection mirror 24 and travels in the —Y direction, and is incident on the fluorescent substance 22. When the source light L0 is incident, the fluorescent substance 22 excites the fluorescent light having the second wavelength and reflects the source light L0 not contributing to the excitation of the fluorescent light. As illustrated in Step S12, the fluorescent substance 22 emits the reflected source light L0 and the excited fluorescent light to the condensing optical system 25. As illustrated in Step S14, the illumination light L emitted from the fluorescent substance 22 is condensed in the condensing optical system 25 and travels in the +Y direction. The illumination light L is incident on the fly-eye lens 28 via the reflection mirror 24 and the light shielding unit 26.

Herein, the reflection mirror 24 is provided between the fluorescent substance 22 and the fly-eye lens 28 in the Y-axis direction. The cross-sectional area perpendicular to the Y axis direction of the reflection mirror 24 is smaller than the cross-sectional area perpendicular to the Y axis direction of the fly-eye lens 28. Namely, the cross-sectional area in the Y axis direction of the reflection mirror 24 is smaller than the optical path area perpendicular to the Y axis direction of the illumination light L which is emitted from the fluorescent substance 22 and condensed in the condensing optical system 25. Therefore, the illumination light L overlaps the reflection mirror 24 in the overlapping region R1, the overlapping region R1 is a portion of the optical path region in the cross-sectional view as viewed from the Y axis direction.

In the illumination light L emitted from the fluorescent substance 22 and traveling in the +Y direction, the illumination light L1 passing through the overlapping region R1 is incident on the reflection mirror 24. The reflection mirror 24 reflects the light having the first wavelength and transmits the light having the second wavelength. Therefore, in the illumination light L1 incident on the reflection mirror 24, only the light having the second wavelength passes through the +Y direction and is incident on the fly-eye lens 28. Namely, the illumination light L incident on the fly-eye lens 28 in the overlapping region R1 does not have the first wavelength component but has the second wavelength component. The reflection mirror 24 may totally reflect the light having the first wavelength traveling in the +Y direction, but the reflection mirror 24 may reflect a portion of the light amount of the light having the first wavelength traveling in the +Y direction and transmit the other light amount. Even in this case, the illumination light L1 passing through the overlapping region R1 has a lower ratio of the first wavelength component (light amount) to the second wavelength component (light amount) than the white light, that is, a stronger yellow component. In other words, the ratio of the first wavelength component to the second wavelength component of the illumination light L1 passing through the overlapping region R1 is lower than the ratio of the illumination light L traveling between the fluorescent substance 22 and the reflection mirror 24.

On the other hand, in the optical path region in the cross-sectional view as viewed from the Y-axis direction, the illumination light L does not overlap the reflection mirror 24 in the Y-axis direction in the non-overlapping region R2. The non-overlapping region R2 is a region (second region) other than the overlapping region R1 (first region) in the optical path region in the cross-sectional view as viewed from the Y axis direction of the illumination light L. In the illumination light L emitted from the fluorescent substance 22 and traveling in the +Y direction, the illumination light L2 passing through the non-overlapping region R2 is incident on the fly-eye lens 28 without passing through the reflection mirror 24. Therefore, the illumination light L incident on the fly-eye lens 28 has the first wavelength component and the second wavelength component in the non-overlapping region R2. In other words, the illumination light L2 passing through the non-overlapping region R2 has a ratio of the first wavelength component to the second wavelength component which is equal to the illumination light L traveling between the fluorescent substance 22 and the reflection mirror 24. Therefore, the illumination light L1 passing through the overlapping region R1 as the first region has the first wavelength component which is smaller than that of the illumination light L2 passing through the non-overlapping region R2 as the second region.

In this manner, in a case where the light shielding unit 26 does not shield light, the illumination light L incident on the fly-eye lens 28 has a high ratio of the second wavelength component, that is, a high yellow component in the overlapping region R1 (first region). Therefore, the illumination light L incident on the fly-eye lens 28 has a ratio between the first wavelength component and the second wavelength component which is the same as that of the white light in the non-overlapping region R2 (second region).

Figure 3:
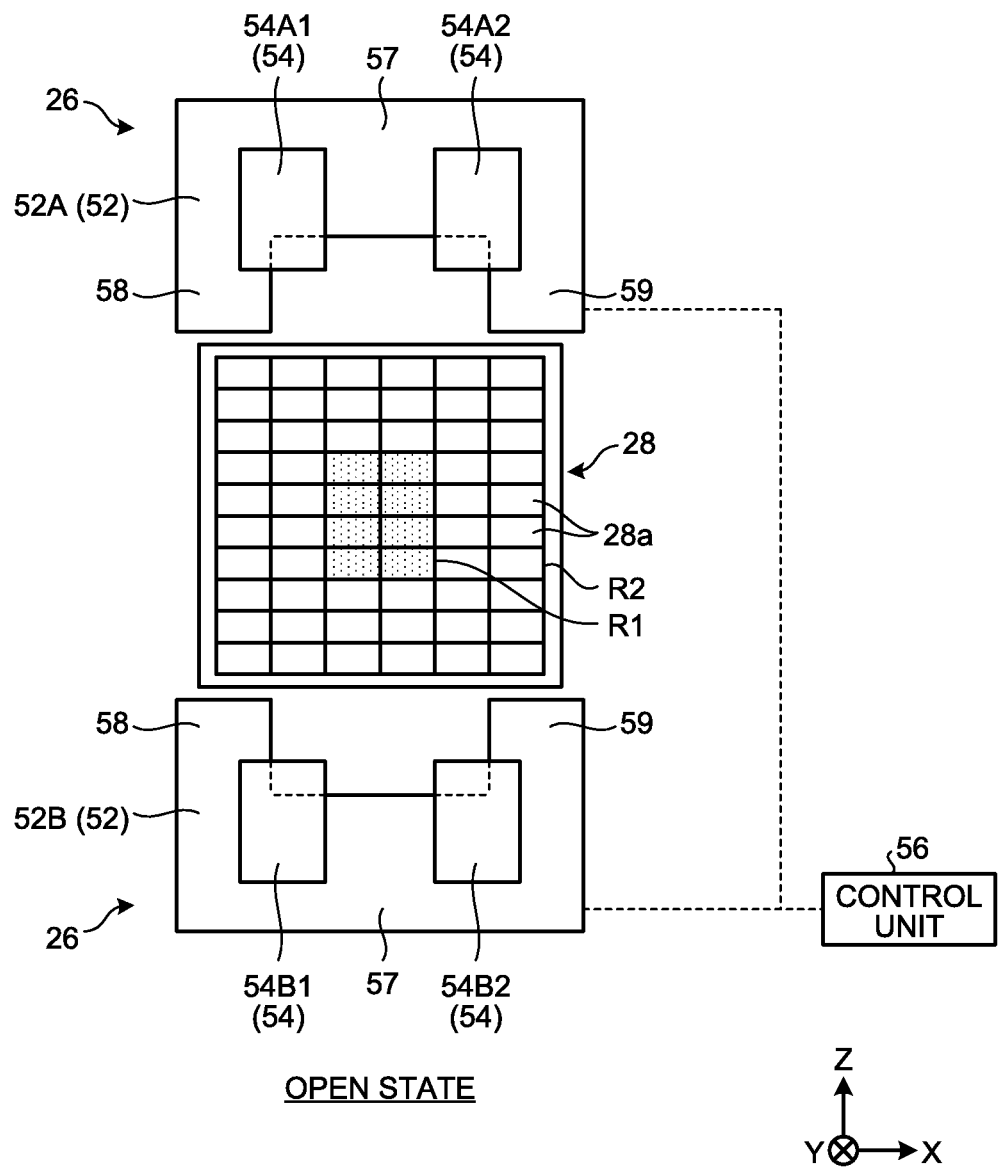
FIG. 3 is a schematic diagram illustrating a light shielding unit.
Figures 4, 5:
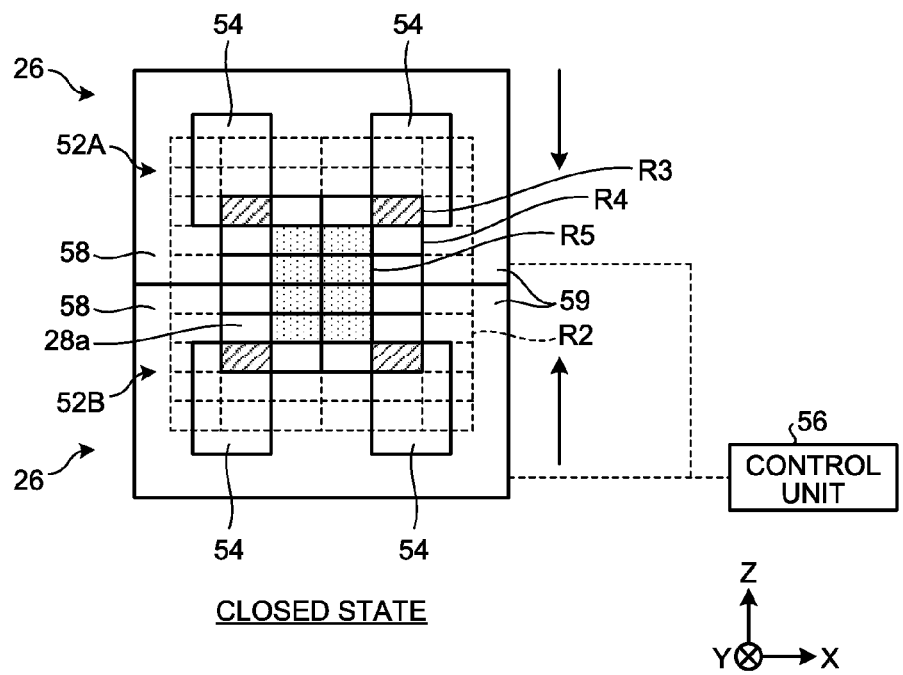
FIG. 4 is a schematic diagram illustrating a light shielding unit.
FIG. 5 is a table for describing examples of area ratios between an open state and a closed state.

Next, the light shielding unit 26 will be described. FIGS. 3 and 4 are schematic diagrams illustrating the light shielding unit. FIGS. 3 and 4 illustrate the case where the light shielding unit 26 is viewed from the fluorescent substance 22 side in the Y axis direction. The light shielding unit 26 is configured to be capable of shielding the illumination light L traveling in the +Y direction from the fluorescent substance 22 toward the fly-eye lens 28. The light shielding unit 26 is configured to be switchable between an open state in which light shielding of the illumination light L is minimized and a closed state in which light shielding of the illumination light L is maximized. FIG. 3 illustrates the open state, and FIG. 4 illustrates the closed state.

As illustrated in FIG. 3, the light shielding unit 26 is configured to include diaphragm units 52A and 52B, filters 54A1, 54A2, 54B1, and 54B2, and a control unit 56. The diaphragm unit 52A is provided on the +Z direction side of the fly-eye lens 28 as viewed from the Y-axis direction. The diaphragm unit 52B is provided on the —Z direction side of the fly-eye lens 28 as viewed from the Y-axis direction. Hereinafter, the diaphragm unit 52A and the diaphragm unit 52B will be referred to as a diaphragm unit 52 in a case where the diaphragm units 52A, 52B are not distinguished from each other.

The diaphragm unit 52 is a plate-shaped member having a bottom surface 57 and end portions 58 and 59. The bottom surface 57 is configured in such a rectangular shape that the length of in the X axis direction is longer than that of the fly-eye lens 28. The end portion 58 extends from the one end portion of the bottom surface 57 in the X axis direction to the fly-eye lens 28 side in the Z axis direction. The end portion 59 extends from the other end portion of the bottom surface 57 in the X axis direction to the fly-eye lens 28 side in the Z axis direction. The end portion 58 and the end portion 59 constitute a groove through which the illumination light L can pass. The diaphragm unit 52 shields the light having the first wavelength and the light having the second wavelength incident on the bottom surface 57 and the end portions 58 and 59. More specifically, the diaphragm unit 52 shields visible light of all colors.

The filter 54A1 is a filter provided on the end portion 58 side of the groove formed by the end portion 58 and the end portion 59 of the diaphragm unit 52A. The filter 54A2 is a filter provided on the end portion 59 side of the groove formed by the end portion 58 and the end portion 59 of the diaphragm unit 52A. The filter 54B1 is a filter provided on the end portion 58 side of the groove formed by the end portion 58 and the end portion 59 of the diaphragm unit 52B. The filter 54B2 is a filter provided on the end portion 59 side of the groove formed by the end portion 58 and the end portion 59 of the diaphragm unit 52B. Hereinafter, the filters 54A1, 54A2, 54B1, and 54B2 are referred to as a filter 54 in a case where the filters 54A1, 54A2, 54B1, and 54B2 are not distinguished.

The filter 54 is provided to the diaphragm unit 52. The filter 54 is a filter that transmits the light having the first wavelength and shields the light having the second wavelength in the light incident on the filter itself. Namely, in the first embodiment, the filter 54 transmits the blue component light and shields the yellow component light. The filter 54 according to the first embodiment completely shields the light having the second wavelength. However, the filter 54 may shield only a portion of the light amount of the light having the second wavelength and transmit the other light amount of the light having the second wavelength. Even in this case, the filter 54 transmits the light having the first wavelength more than the light having the second wavelength. Therefore, the light transmitted through the filter 54 has a lower ratio of the second wavelength component (light amount) to the first wavelength component (light amount) than the white light, that is, a higher blue component. In addition, the filter 54 may shield or transmit light other than the first wavelength and the second wavelength as long as it shields the light having the second wavelength and transmits the light having the first wavelength. The shapes of the diaphragm unit 52 and the filter 54 are not limited to the above description, and arbitrary shapes may be used.

The control unit 56 switches between the open state illustrated in FIG. 3 and the closed state illustrated in FIG. 4 by moving the diaphragm unit 52 in the Z axis direction. The control unit 56 gradually switches from the open state to the closed state by moving the diaphragms 52A and 52B in the directions to be close to each other in the Z axis direction. Similarly, the control unit 56 gradually switches from the closed state to the open state by moving the diaphragms 52A and 52B in the directions to be separated from each other in the Z-axis direction. In addition, the filter 54 is fixed to the diaphragm unit 52. Therefore, the control unit 56 may also move the filter 54 in the Z-axis direction as the diaphragm unit 52 moves.

The open state is a state in which the light shielding of the illumination light L by the diaphragm unit 52 is minimized. As illustrated in FIG. 3, the open state is a state in which the diaphragms 52A and 52B are furthest separated from each other, that is, a state where the diaphragm unit 52 is opened mostly (fully opened). In other words, the open state is a state in which the area where the diaphragm unit 52 and the filter 54 overlap the optical path region (fly-eye lens 28) of the illumination light L is minimized. More specifically, the diaphragm unit 52 in the first embodiment does not overlap the fly-eye lens 28 as viewed from the Y-axis direction in the open state. In the open state, the diaphragm unit 52 is arranged outside the fly-eye lens 28. The filter 54 is also arranged at a position not overlapping the fly-eye lens 28 as viewed from the Y-axis direction, that is, at a position outside the fly-eye lens 28. Therefore, in the open state, the diaphragm unit 52 and the filter 54 do not overlap the optical path region of the illumination light L from the fluorescent substance 22. Therefore, the illumination light L from the fluorescent substance 22 does not reach the diaphragm unit 52 and the filter 54 but passes through the space inside thereof. In the open state, the illumination light L from the fluorescent substance 22 is incident on the fly-eye lens 28 without being shielded by the diaphragm unit 52 and the filter 54.

On the other hand, the closed state is a state in which the light shielding of the illumination light L by the diaphragm unit 52 is maximized. As illustrated in FIG. 4, the closed state is a state in which the diaphragm units 52A and 52B are arranged at the positions where the diaphragm units 52A and 52B are closest to each other, that is, a state in which the diaphragm unit 52 is most closed (fully closed state). In other words, the closed state is a state in which the area where the diaphragm unit 52 overlaps the optical path region (fly-eye lens 28) of the illumination light L is maximized. In the example of FIG. 4, in the closed state, the distal ends of the end portions 58 and 59 of the diaphragm unit 52A are in contact with the distal ends of the end portions 58 and 59 of the diaphragm unit 52B. The diaphragm units 52A and 52B overlap a portion of the fly-eye lens 28 as viewed from the Y-axis direction. The diaphragm unit 52 does not overlap the fly-eye lens 28 in a gap (groove) between the end portion 58 and the end portion 59. Therefore, in the closed state, the illumination light L from the fluorescent substance 22 is shielded in the region overlapping the diaphragm unit 52, and only light traveling in the region (groove) not overlapping the diaphragm unit 52 is incident on the fly-eye lens 28.

In addition, in the closed state, the filters 54 are also positioned closest to each other. Namely, the closed state is a state in which the area where the filter 54 overlaps the optical path region (fly-eye lens 28) of the illumination light L is maximized. In the closed state, the filter 54 overlaps a portion of the fly-eye lens 28 as viewed in the Y-axis direction. Therefore, in the light traveling in the region overlapping the filter 54 out of the light traveling in the region not overlapping the diaphragm unit 52 with respect to the illumination light L from the fluorescent substance 22, the light having the second wavelength is shielded, and the light having the first wavelength is transmitted to be incident on the fly-eye lens 28. In addition, in the light traveling in the region not overlapping the filter 54 out of the light traveling in the region not overlapping the diaphragm unit 52 with respect to the illumination light L from the fluorescent substance 22, the light having the first wavelength and the light having the second wavelength are transmitted to be incident on the fly-eye lens 28.

In addition, in the first embodiment, the reflection mirror 24 is provided in the vicinity of the center of the fly-eye lens 28 as viewed in the Y-axis direction. Therefore, the non-overlapping region R2 is provided so as to surround the outer side of the overlapping region R1, more specifically, the periphery of the overlapping region R1. In the open state, the diaphragm unit 52 and the filter 54 do not overlap the overlapping region R1 and do not overlap the non-overlapping region R2. On the other hand, in the closed state, the diaphragm unit 52 overlaps at least a portion of the non-overlapping region R2 but does not overlap the overlapping region R1. Similarly, in the closed state, the filter 54 overlaps at least a portion of the non-overlapping region R2 but does not overlap the overlapping region R1. In the closed state, the filter 54 shields the light having the second wavelength of the illumination light L in the region overlapping the filter 54 out of the illumination light L passing through the non-overlapping region R2. However, in the closed state, the diaphragm unit 52 and the filter 54 may overlap the overlapping region R1 in addition to the non-overlapping region R2. In this case, in the closed state, the diaphragm unit 52 and the filter 54 do not overlap the entire regions of the overlapping region R1 and the non-overlapping region R2.

Herein, the ratio between the first wavelength component (light amount) and the second wavelength component (light amount) in the illumination light L incident on the fly-eye lens 28 is defined as a component ratio. The component ratio is a ratio between the sum of the first wavelength components (light amount) in the entire region of the optical path region of the illumination light L and the sum of the second wavelength components (light amount) in the entire region of the optical path region of the illumination light L. The light shielding unit 26 shields the light having the second wavelength by using the filter 54 in the closed state so that the component ratio in the closed state is within a predetermined range (component range) with respect to the component ratio in the open state. Herein, since the component ratio is the ratio between the first wavelength component and the second wavelength component, the component ratio can be referred to as a ratio of balance of the color components. Therefore, in a case where the component ratio in the closed state is close to the component ratio in the open state, the change in balance of the color components in the open state and the closed state is decreased. In addition, with respect to the above-described component range, in a case where the difference in the component ratio between the open state and the closed state is within the component range, the difference in the color temperature between the open state and the closed state of the illumination light L incident on the fly-eye lens 28 is a predetermined value or less. It is preferable that the predetermined value at this color temperature is set, for example, so that the value obtained by subtracting the color temperature in the open state from the color temperature in the closed state is a value between −1000 K and +1000 K. It is more preferable that the predetermined value at this color temperature is set, for example, so that the absolute value of the difference between the color temperature in the closed state and the color temperature in the open state is a value of 1000 K or less.

In the first embodiment, by presetting the area of the region where the filter 54 overlaps the optical path region in the closed state, the light shielding unit 26 allows the component ratio in the closed state to be within the component range with respect to the component ratio in the open state. Herein, in the optical path region in the cross-sectional view perpendicular to the Y-axis direction of the illumination light L, the region (region indicated by hatching in FIG. 4) as the non-overlapping region R2 (second region) which filter 54 overlaps is defined as a blue transmission region R3. In addition, in the optical path region in the cross-sectional view perpendicular to the Y-axis direction of the illumination light L, the region (region indicated by a plain solid line in FIG. 4) as the non-overlapping region R2 (second region) which both of the diaphragm unit 52 and the filter 54 do not shield (do not overlap) is defined as a total transmission region R4. In addition, in the optical path region in the cross-sectional view perpendicular to the Y-axis direction of the illumination light L, the region (region indicated by a dotted point in FIG. 4) as the overlapping region R1 (first region) which both of the diaphragm unit 52 and the filter 54 do not shield (do not overlap) is defined as a yellow transmission region R5. The blue transmission region R3 is a region in which the light having the second wavelength (light having the yellow component) is shielded by using the filter 54 and the light having the first wavelength (light having the blue component) is transmitted without being shielded. The total transmission region R4 is a region in which both the light having the first wavelength (light having the blue component) and the light having the second wavelength (light having the yellow component) are transmitted without being shielded. The yellow transmission region R5 is a region in which the light having the first wavelength (light having the blue component) is shielded by the reflection mirror 24 and the light having the second wavelength (light having the yellow component) is transmitted without being shielded. In addition, in the optical path region in the cross-sectional view perpendicular to the Y-axis direction of the illumination light L, the regions other than the blue transmission region R3, the total transmission region R4, and the yellow transmission region R5 are regions overlapping the diaphragm unit 52 as entire light shielding regions in which light of both the light having the first wavelength and the light having the second wavelength are shielded.

The light shielding unit 26 shields the light having the second wavelength by using the filter 54 so that the area ratio between the blue transmission region R3, the total transmission region R4, and the yellow transmission region R5 in the closed state has a preset value. Herein, the regions through which the light having the first wavelength (light having the blue component) passes are the blue transmission region R3 and the total transmission region R4. In addition, the regions through which the light having the second wavelength (light having the yellow component) passes are the total transmission region R4 and the yellow transmission region R5. Herein, the region through which the light having the first wavelength (light having the blue component) passes, that is, the region obtained by adding the blue transmission region R3 and the total transmission region R4 is defined as the first wavelength region RB. In addition, the region through where the light having the second wavelength (light having the yellow component) passes, that is, the region obtained by adding the total transmission region R4 and the yellow transmission region R5 is defined as the second wavelength region RY. The light shielding unit 26 performs light shielding by using the filter 54 in the closed state so that the area ratio between the first wavelength region RB and the second wavelength region RY in the closed state is within a predetermined range (area range) with respect to the area ratio between the first wavelength region RB and the second wavelength region RY in the open state. The area ratio between the first wavelength region RB and the second wavelength region RY can be referred to as the ratio of the components of the light having the first wavelength and the light having the second wavelength in the illumination light L incident on the fly-eye lens 28, that is, a ratio of balance of the color components. Therefore, by presetting the area of the region where the filter 54 and the diaphragm unit 52 overlap so as to achieve such the area ratio, the light shielding unit 26 decreases a change in balance of the color components between the open state and the closed state. In addition, in a case where the area ratio between the open state and the closed state is within such the area range, the area range is such that the difference in color temperature between the open state and the closed state of the illumination light L incident on the fly-eye lens 28 is the predetermined value described above or less.

Herein, in the optical path region in the cross-sectional view perpendicular to the Y-axis direction of the illumination light L, the first wavelength region RB corresponds to the region which both of the diaphragm unit 52 and the filter 54 do not overlap (do not shield). In addition, in the optical path region in a cross-sectional view perpendicular to the Y axis direction of the illumination light L, the second wavelength region RY corresponds to the region as the non-overlapping region R2 (second region) which the diaphragm unit 52 does not shield (does not overlap).

The microlenses 28*a* included in the fly-eye lens 28 have substantially the same area one another. Therefore, the area ratio between the first wavelength region RB and the second wavelength region RY can be expressed as the number of microlenses 28*a*. The first wavelength region RB and the second wavelength region RY will be described by using the number of microlenses 28*a* of the fly-eye lens 28 on the basis of the examples of FIGS. 3 and 4. As illustrated in the example of FIG. 3, in the open state, the diaphragm unit 52 and the filter 54 do not overlap the optical path region of the illumination light L. Namely, the first wavelength region RB in the open state is a region excluding the microlenses 28*a* overlapping the overlapping region R1 out of all the microlenses 28*a* (in the example of FIG. 3, the region corresponding to 52 pieces of microlenses 28*a*). In addition, the second wavelength region RY in the open state is a region including all the microlenses 28*a* (in the example of FIG. 3, the region corresponding to 60 pieces of microlenses 28*a*). In addition, as illustrated in the example of FIG. 4, the first wavelength region RB in the closed state is a region including the microlenses 28*a* overlapping the blue transmission region R3 or the total transmission region R4 (in the example of FIG. 4, the region corresponding to 16 pieces of microlenses 28*a*). In addition, the second wavelength region RY in the closed state is a region including the microlenses 28*a* overlapping the total transmission region R4 or the yellow transmission region R5 (in the example of FIG. 4, the region corresponding to 20 pieces of microlenses 28*a*). In this manner, the light shielding unit 26 performs light shielding by using the filter 54 so that the ratio in the closed state between the number of the microlenses 28*a* overlapping the first wavelength region RB and the number of the microlenses 28*a* overlapping the second wavelength region RY is within a predetermined range (number range) with respect to the ratio in the open state.

In other words, in the closed state, in the optical path region in the cross-sectional view perpendicular to the Y-axis direction of the illumination light L, the light shielding unit shields the light having the second wavelength so that the area ratio between the region not overlapped (not shielded) by both of the diaphragm unit 52 and the filter 54 and the region as the non-overlapping region R2 (second region) not shielded (not overlapped) by the diaphragm unit 52 is within a predetermined range (number range) with respect to the number of microlenses 28*a* between the region not shielded by the filter 54 in the open state and the region as the non-overlapping region R2 (second region) not shielded (not overlapped) by the diaphragm unit 52. Herein, since the areas of all microlenses 28*a* are equal, the description can be made by replacing the number with the area.

FIG. 5 is a table for describing examples of area ratios between the open state and the closed state. FIG. 5 illustrates area ratios in the first embodiment having the filter 54 and area ratios in Comparative Example having no filter 54. FIG. 5 illustrates the area ratios between the first wavelength region RB and the second wavelength region RY in the case of the layout illustrated in FIGS. 3 and 4 by the numbers of overlapping microlenses 28*a*. As illustrated in FIG. 5, in the first embodiment, in the open state, the first wavelength region RB is 52 (region where 52 pieces of microlenses 28*a* overlap), and the second wavelength region RY is 60. In the first embodiment, in the closed state, the first wavelength region RB is 16, and the second wavelength region RY is 20. In Comparative Example having no filter, in the open state, the first wavelength region RB is 52, and the second wavelength region RY is 60. In Comparative Example, in the closed state, the first wavelength region RB is 16, and the second wavelength region RY is 24.

In the first embodiment, the area ratio of the first wavelength region RB to the second wavelength region RY is 86.7% in the open state and 80.0% in the closed state. In this case, the color temperature of the illumination light L in the open state is 6500 K, and the color temperature of the illumination light L in the open state is 6200 K. On the other hand, in Comparative Example, the area ratio of the first wavelength region RB to the second wavelength region RY is 86.7% in the open state and 66.7% in the closed state. In the case of Comparative Example, the color temperature of the illumination light L in the open state is 6500 K, and the color temperature of the illumination light L in the open state is 5500 K. As described above, in the first embodiment, since the light having the second wavelength is shielded by using the filter 54, a great change of the balance (color temperature) of the color components in the closed state from the balance (color temperature) of the color components in the open state is suppressed.

In this manner, in the first embodiment, by presetting the region which the filter 54 shields in the closed state by using the filter 54 for completely shielding the light having the second wavelength, the component ratio in the closed state is set to be within the component range with respect to the component ratio in the open state. However, the method of setting the component ratio in the closed state to be within the range of the component range with respect to the component ratio in the open state is not limited thereto. For example, the light shielding unit 26 may preset the light amount of the light having the second wavelength which the filter 54 shields in the closed state by using the filter 54 that shields the light amount corresponding to a portion of the light having the second wavelength. Therefore, the light shielding unit 26 shields the light having the second wavelength in the closed state by using the filter 54 so that the component ratio in the closed state is within a predetermined range (component range) with respect to the component ratio in the open state.

As described above, the light emitting device 10 according to the first embodiment is configured to include the light source 20, the fluorescent substance 22, the fly-eye lens 28, and the light shielding unit 26. The light source 20 emits the source light L0 having the first wavelength. The source light L0 is incident on the fluorescent substance 22, and the fluorescent substance 22 excites fluorescent light having the second wavelength by the source light L0 and reflects the source light L0 to emit the source light L0 and fluorescent light as illumination light L. The illumination light L is incident on the fly-eye lens 28. The light shielding unit 26 is provided between the fluorescent substance 22 and the fly-eye lens 28. In the illumination light L incident on the fly-eye lens 28, the first wavelength component in the first region (overlapping region R1) is smaller than that in the second region (non-overlapping region R2). The first region is a partial region in the optical path region of the illumination light L in the cross-sectional view with respect to the light traveling direction (Y-axis direction). The second region is a region other than the first region. In addition, the light shielding unit 26 is configured to include a diaphragm unit 52 and a filter 54. The diaphragm unit 52 shields the illumination light L. The filter 54 shields the light having the second wavelength of the illumination light L in the second region (non-overlapping region R2) and transmits the light having the first wavelength of the illumination light L in the second region.

In the fly-eye lens 28 of the light emitting device 10, the illumination light L having a high ratio of the second wavelength component to the first wavelength component is incident on the first region. Namely, in the illumination light L, the balance of the color components of the three colors is different between the first region and the second region. If such illumination light L is shielded by the diaphragm unit 52, there may be a problem that the component ratio of the first wavelength component and the second wavelength component of the illumination light L, that is, the color development is deviated between the condition not shielding by the diaphragm unit 52 (open state) and the condition shielding by the diaphragm unit 52 (closed state). However, in the light emitting device 10 according to the first embodiment, by shielding the light having the second wavelength having a high component ratio by using the filter 54, it is possible to suppress an increase in difference between the first wavelength component and the second wavelength component. Therefore, the light emitting device 10 suppresses the change in balance of the color components of the three colors when the diaphragm unit 52 is used.

In addition, the light shielding unit 26 is switchable between an open state and a closed state. The open state is a state in which the light shielding of the illumination light L by the diaphragm unit 52 is minimized. The closed state is a state in which the light shielding of the illumination light L by the diaphragm unit 52 is maximized and the filter 54 shields the light having the second wavelength in at least a portion of the second region. The first region is a region having a high second wavelength component. In the closed state, the light shielding unit 26 shields the second wavelength component in the second region by using the filter 54. In the closed state, the light shielding unit 26 shields the light having the second wavelength component by using the filter 54, so as to suppress a great change of the component ratio between the first wavelength component and the second wavelength component in the closed state from the component ratio in the open state. Therefore, the light emitting device 10 more appropriately suppresses the change in balance of the color components of the three colors when the diaphragm unit 52 is used.

In addition, the light emitting device 10 is configured to further include a reflection mirror 24. The reflection mirror 24 is provided between the fluorescent substance 22 and the light shielding unit 26 to reflect the light having the first wavelength and transmit the light having the second wavelength. The reflection mirror 24 reflects the source light L0 from the light source 20 and emits the source light to the fluorescent substance 22. The illumination light L incident on the fly-eye lens 28 includes the light having the second wavelength component transmitted through the reflection mirror 24 in the overlapping region R1 overlapping the reflection mirror 24. The illumination light L includes the light having the first wavelength component and the second wavelength component in the non-overlapping region R2 other than the overlapping region R1. In the closed state, in the light shielding unit 26, the filter 54 overlaps the non-overlapping region R2, and the light shielding unit shields the light having the second wavelength of the illumination light L in the non-overlapping region R2.

The reflection mirror 24 reflects the source light L0 toward the fluorescent substance 22. The reflection mirror 24 reflects the light having the first wavelength included in the illumination light L to be emitted from the fluorescent substance 22. Therefore, the illumination light L from the fluorescent substance 22 has a low first wavelength component in the overlapping region R1 overlapping the reflection mirror 24. In the case where such illumination light L is used, there may be a problem that the component ratio between the first wavelength component and the second wavelength component in the entire optical path region in the closed state changes greatly from the open state. However, in the first embodiment, by shielding the light having the second wavelength of the illumination light L in the non-overlapping region R2 in the closed state, it is possible to suppress a great change of the component ratio in the closed state from the open state. Therefore, the light emitting device 10 more appropriately suppresses the change in balance of the color components of the three colors when the diaphragm unit 52 is used.

The light shielding unit 26 shields the light having the second wavelength by using the filter 54 so that the component ratio of the illumination light L incident on the fly-eye lens 28 in the closed state is within a predetermined range with respect to the component ratio of the illumination light L incident on the fly-eye lens 28 in the open state. The component ratio is a ratio between the first wavelength component (light amount) and the second wavelength component (light amount). The light shielding unit 26 performs light shielding by using the filter 54 so that the component ratio in the closed state is within a predetermined range (component range) with respect to the component ratio in the open state. Therefore, the light shielding unit 26 can suppress a great change of the component ratio in the closed state from the open state. Therefore, the light emitting device 10 more appropriately suppresses the change in balance of the color components of the three colors when the diaphragm unit 52 is used.

In the closed state, the light shielding unit 26 shields the light having the second wavelength by using the filter 54 so that the area ratio between the first wavelength region RB and the second wavelength region RY is within a predetermined range with respect to the area ratio between the first wavelength region RB and the second wavelength region RY in the open state. The first wavelength region RB is a region through which the light having the first wavelength passes. The second wavelength region RY is a region through which the light having the second wavelength passes. The light shielding unit 26 allows the area ratio in the closed state to be within a predetermined range with respect to the area ratio in the open state. Therefore, the light shielding unit 26 suppresses a great change of the area ratio between the first wavelength region RB through which the light having the first wavelength passes and the second wavelength region RY through which the light having the second wavelength passes in the closed state. Therefore, the light emitting device 10 more appropriately suppresses the change in balance of the color components of the three colors when the diaphragm unit 52 is used.

Second Embodiment

Next, a second embodiment will be described. A light emitting device 10A according to the second embodiment is different from that in the first embodiment in that a light shielding unit 26A independently controls the movement of a filter 54A. Description of components in the second embodiment common to the first embodiment will be omitted.

FIG. 6 is an explanatory diagram illustrating a light shielding unit according to the second embodiment. As illustrated in FIG. 6, the light shielding unit 26A according to the second embodiment is configured to include a diaphragm unit 52, a filter 54A, and a control unit 56A. The shapes of the diaphragm unit 52 and the filter 54A are the same as those of the first embodiment.

Similarly to the first embodiment, the control unit 56A moves the diaphragm unit 52 in the Z-axis direction. In addition, the control unit 56A moves the filter 54A independently from the diaphragm unit 52 in the Z-axis direction. Namely, the control unit 56A moves the filter 54A individually, so that the position of the filter 54A with respect to the diaphragm unit 52 is moved in the Z axis direction.

When switching between the open state and the closed state, the control unit 56A moves the filter 54A with respect to the diaphragm unit 52 while moving the diaphragm unit 52. Herein, the state where the position of the diaphragm unit 52 is located between the open state and the closed state is defined as an intermediate state. The control unit 56A controls the light shielding amount of the light having the second wavelength of the filter 54A by moving the filter 54A with respect to the diaphragm unit 52 so that the component ratio of the illumination light L incident on the fly-eye lens 28 in the intermediate state is within the predetermined range (component range) with respect to the component ratio of the illumination light L incident on the fly-eye lens 28 in the open state. Namely, in the second embodiment, by independently driving the filter 54A, the component ratios in the intermediate state as well as the closed state can be close to the open state.

Step S20 in FIG. 6 illustrates the open state, Step S22 illustrates the intermediate state, and Step S24 illustrates the closed state. As illustrated in Step S20, the position of the diaphragm unit 52 in the open state is the same as that in the first embodiment. In addition, the movement of the diaphragm unit 52 at the time of switching from the open state to the closed state is also the same as that in the first embodiment. Therefore, the position of the diaphragm unit 52 in the intermediate state and the closed state is also the same as that in the first embodiment. On the other hand, as illustrated in Steps S22 and S24, the control unit 56A moves the filter 54A by switching from the open state to the closed state, that is, by closing the diaphragm unit 52, so that the area of protrusion of the filter 54A from the diaphragm unit 52 toward the optical path region is increased. Therefore, the area where the filter 54A overlaps the optical path region (fly-eye lens 28) in the intermediate state is larger than the area of the first embodiment (the case where the filter is not moved independently). Similarly, according to switching from the closed state to the open state, that is, according to opening the diaphragm unit 52, the control unit 56A moves the filter 54A to reduce the area of protrusion of the filter 54A from the diaphragm unit 52 toward the optical path region. In the example of FIG. 6, by controlling the filter 54A in this manner, the component ratio of the illumination light L incident on the fly-eye lens 28 in the closed state and the intermediate state is controlled so as to be within the predetermined range (component range) with respect to the component ratio of the illumination light L incident on the fly-eye lens 28 in the closed state. However, the control of the filter 54A by the control unit 56A is not limited to the example of FIG. 6.

Third Embodiment

Next, a third embodiment will be described. A light shielding unit 26B according to the third embodiment is different from that of the first embodiment in terms of the shape of the filter 54B. Description of components in the third embodiment common to the first embodiment will be omitted.

FIG. 7 is an explanatory diagram illustrating a light shielding unit according to the third embodiment. Although the filter according to the first embodiment has a shape of a rectangle, the shape of the filter is not limited to a rectangle, but the shape may be arbitrarily set. For example, as illustrated in FIG. 7, the filter 54B may be provided with notches 55. The notches 55 are provided at the vertexes of the filter 54B. By setting the shape of the filter 54B in this manner, it is possible to appropriately set the area where the filter 54B overlaps the optical path region in the intermediate state.

According to the present embodiment, it is possible to suppress a change in balance of color components when a diaphragm is used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light emitting device comprising:
a light source which emits source light having a first wavelength;
a fluorescent substance on which the source light is incident and which excites fluorescent light having a second wavelength by the source light, reflects the source light, and emits the source light and the fluorescent light as illumination light;
a fly-eye lens on which the illumination light is incident; and
a light shielding unit which is provided between the fluorescent substance and the fly-eye lens and is configured to be capable of shielding a portion of the illumination light,
wherein, in the illumination light incident on the fly-eye lens, a first wavelength component in a first region which is a portion of a region in a cross-sectional view with respect to the traveling direction of the light is smaller than that in a second region which is a region other than the first region, and
wherein the light-shielding unit includes:
a diaphragm unit which shields the illumination light; and
a filter that shields light having the second wavelength of the illumination light in the second region and transmits light having the first wavelength of the illumination light in the second region.

2. The light emitting device according to claim 1, wherein the light shielding unit is switchable between an open state in which light shielding of the illumination light of the diaphragm unit is minimized and a closed state in which light shielding of the illumination light of the diaphragm unit is maximized and the filter shields the light having the second wavelength in at least a portion of the second region.

3. The light emitting device according to claim 2, further comprising a reflection mirror which is provided between the fluorescent substance and the light shielding unit and which reflects the light having the first wavelength and transmits the light having the second wavelength and reflects the source light from the light source and emits the light to the fluorescent substance,
wherein the illumination light incident on the fly-eye lens includes light having a second wavelength component passing through the reflection mirror in an overlapping region overlapping the reflection mirror and includes light having the first wavelength component and the second wavelength component in a non-overlapping region other than the overlapping region, and
wherein, in the closed state, the light shielding unit allows the filter to overlap the non-overlapping region and shields the light having the second wavelength of the illumination light in the non-overlapping region.

4. The light emitting device according to claim 2, wherein in the closed state, the light shielding unit allows the filter to shield the light having the second wavelength so that a component ratio between the first wavelength component and the second wavelength component of the illumination light incident on the fly-eye lens is within a predetermined range with respect to the component ratio of the illumination light incident on the fly-eye lens in the open state.

5. The light emitting device according to claim 4, wherein in the closed state, the light shielding unit allows the filter to shield the light having the second wavelength so that an area ratio between a first wavelength region through which the light having the first wavelength component passes and a second wavelength region through which the light having the second wavelength component passes is within a predetermined range with respect to the area ratio between the first wavelength region and the second wavelength region in the open state.

6. A projection type image display apparatus comprising the light emitting device according to claim 1 and displaying an image by the illumination light emitted from the fly-eye lens.

* * * * *